US011538040B2

(12) United States Patent
Kurani et al.

(10) Patent No.: US 11,538,040 B2
(45) Date of Patent: Dec. 27, 2022

(54) SYSTEMS AND METHODS FOR ACCOUNT VALIDATION (71) Applicant: JPMORGAN CHASE BANK, N.A., New York, NY (US)

(72) Inventors: Sameer Kurani, London (GB); Stew Cofer, London (GB); Mark Jones, Dorset (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 17 days.

(21) Appl. No.: 17/174,040

(22) Filed: Feb. 11, 2021

(65) Prior Publication Data

US 2021/0248610 A1 Aug. 12, 2021

Related U.S. Application Data (60) Provisional application No. 62/975,421, filed on Feb. 12, 2020.

(51) Int. Cl.
*G06Q 20/02* (2012.01)
*G06Q 20/40* (2012.01)
(Continued)

(52) U.S. Cl.
CPC ........ *G06Q 20/4016* (2013.01); *G06N 3/08* (2013.01); *G06N 20/10* (2019.01)

(58) Field of Classification Search
USPC .......... 705/39, 40, 45, 37, 38; 235/378, 375
See application file for complete search history.

(56) References Cited

U.S. PATENT DOCUMENTS 8,170,953 B1* 5/2012 Tullis ................. G06Q 20/4016
705/77
8,453,226 B2* 5/2013 Hammad ............... G06Q 20/12
726/9
(Continued)

FOREIGN PATENT DOCUMENTS

WO 2014160296 10/2014

OTHER PUBLICATIONS

Virtual card payment protocol and risk analysis using performance scoring; Proceedings 15th International Parallel and Distributed Processing Symposium. IPDPS 2001 (pp. 7 pp.); Xu Xianhua, Sung Sam Yuan, Ge Ling, Tan Chew Lim. Apr. 23, 2001. (Year: 2001).*

(Continued)

*Primary Examiner* — Tien C Nguyen
(74) *Attorney, Agent, or Firm* — Greenberg Traurig LLP (57) ABSTRACT

Systems and methods for account validation are disclosed. A method may include: receiving, at a validation computer program and from a client device, a request to validate payment information; querying, by the validation computer program, a plurality of validation systems with at least some of the payment information; receiving, at the validation computer program, a query response from each validation system; calculating, by the validation computer program, a risk score for each validation system based on a comparison between the payment information and the query response; weighting, by the validation computer program, the risk score for each validation system, wherein the weighting may be based on an accuracy of past risk scores for each validation system; aggregating, by the validation computer program, the weighted risk scores into a cumulative risk score; and outputting the cumulative risk score to the client device.

18 Claims, 3 Drawing Sheets

(51) Int. Cl.
*G06N 3/08* (2006.01)
*G06N 20/10* (2019.01)

(56) References Cited

U.S. PATENT DOCUMENTS

| | | | | |
|---|---|---|---|---|
| 8,666,893 | B1* | 3/2014 | Jones | G06Q 40/02 |
| | | | | 705/38 |
| 10,140,597 | B2* | 11/2018 | Benton | G06V 30/413 |
| 2005/0283429 | A1* | 12/2005 | Bates | G06Q 20/40 |
| | | | | 705/38 |
| 2009/0112752 | A1 | 4/2009 | Milana | |
| 2015/0154600 | A1 | 6/2015 | Diehl et al. | |
| 2017/0323372 | A1* | 11/2017 | Bennett | G06Q 30/0637 |
| 2020/0042971 | A1* | 2/2020 | Eby | H04L 63/0823 |
| 2021/0248610 | A1* | 8/2021 | Kurani | G06N 20/10 |

OTHER PUBLICATIONS

Delegate: A Proxy Based Architecture for Secure Website Access from an Untrusted Machine; 2006 22nd Annual Computer Security Applications Conference (ACSAC'06) (pp. 57-66); R.C. Jammalamadaka, T.W. van der Horst, S. Mehrotra, K.E. Seamons, N. Venkasubramanian, Dec. 11, 2006. (Year: 2006).*

International Search Report, dated May 27, 2021, from corresponding International Application No. PCT/US2021/017797.

Written Opinion of the International Searching Authority, dated May 27, 2021, from corresponding International Application No. PCT/US2021/017797.

\* cited by examiner

SYSTEMS AND METHODS FOR ACCOUNT VALIDATION

RELATED APPLICATIONS

This application claims priority to U.S. Provisional Patent Application Ser. No. 62/975,421 filed Feb. 12, 2020, the disclosure of which is hereby incorporated by reference in its entirety.

BACKGROUND OF THE INVENTION

1. Field of the Invention

Embodiments relate to analyzing payment information to determine a fraud score representing the likelihood that the payment information is a result of fraud.

2. Description of the Related Art

With over one billion financial accounts globally ready to transact, there is a risk of fraud relating to information used to facilitate a payment transaction. The fraud may originate from a payor or the vendor, as an imposter may interject itself into the payment process in order to have payment made to the wrong entity.

SUMMARY OF THE INVENTION

Systems and methods for account validation are disclosed. In one embodiment, a computer-based method for processing a validation request may include: (1) receiving, at a validation computer program executed by a server comprising at least one computer processor and from a client device, a request to validate payment information; (2) querying, by the validation computer program, a plurality of validation systems with at least some of the payment information; (3) receiving, at the validation computer program, a query response from each validation system; (4) calculating, by the validation computer program, a risk score for each validation system based on a comparison between the payment information and the query response; (5) weighting, by the validation computer program, the risk score for each validation system, wherein the weighting may be based on an accuracy of past risk scores for each validation system; (6) aggregating, by the validation computer program, the weighted risk scores into a cumulative risk score; and (7) outputting the cumulative risk score to the client device. The client device may take an action in response to the cumulative risk score.

In one embodiment, the request may be received at a portal.

In one embodiment, the request may be automatically generated by the client device in response to the client device scanning a machine-readable code.

In one embodiment, the payment information may include bank account information, financial instrument information, payee information, and/or payor information.

In one embodiment, the request may be received in a batch comprising a plurality of requests.

In one embodiment, the validation systems may include a financial institution system, an industry utility system, an interbank blockchain system, and/or a credit agency system.

In one embodiment, the plurality of validation systems may be selected from a second plurality of validation systems, wherein the plurality of validation systems may be a subset of the second plurality of validation systems.

In one embodiment, each risk score may be based on a degree of match between the payment information and the query responses.

In one embodiment, the cumulative risk score may be provided as a binary value based on a threshold.

In one embodiment, the validation computer program may calculate the risk score for each response using an additive model, a linear model, a neural network, a support vector machine, and/or a decision tree.

According to another embodiment, a computer-based system for processing a validation request may include a client device; a server comprising at least one computer processor and executing a validation computer program; and a plurality of validation systems. The validation computer program may receive a request to validate payment information from the client device and may query the plurality of validation systems with at least some of the payment information. Each of the plurality of validation systems may return a query response to the validation computer program. The validation computer program may calculate a risk score for each validation system based on a comparison between the payment information and the query response, may weight he risk score for each validation system, wherein the weighting may be based on an accuracy of past risk scores for each validation system; may aggregate the weighted risk scores into a cumulative risk score, and may output the cumulative risk score to the client device. The client device may take an action in response to the cumulative risk score.

In one embodiment, the request may be received at a portal.

In one embodiment, the request may be automatically generated by the client device in response to the client device scanning a machine-readable code.

In one embodiment, the payment information may include bank account information, financial instrument information, payee information, and/or payor information.

In one embodiment, the request may be received in a batch comprising a plurality of requests.

In one embodiment, the validation systems may include a financial institution system, an industry utility system, an interbank blockchain system, and/or a credit agency system.

In one embodiment, the plurality of validation systems may be selected from a second plurality of validation systems, wherein the plurality of validation systems may be a subset of the second plurality of validation systems.

In one embodiment, each risk score may be based on a degree of match between the payment information and the query responses.

In one embodiment, the cumulative risk score may be provided as a binary value based on a threshold.

In one embodiment, the validation computer program may calculate the risk score for each response using an additive model, a linear model, a neural network, a support vector machine, and/or a decision tree.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Embodiments are directed to validating potential transactions to assess a risk of fraud. A vendor requesting payment may provide payment instructions to a customer. The payment instructions provided to the customer, however, may be fraudulent in order to cause the customer to pay a fraudulent party. A fraudulent party may pose as a legitimate vendor, or the fraudulent party may alter payment instructions. In one example, the vendor may be an entity responsible for selling an item, real estate, personal property, a service. The vendor may inform the customer that payment instructions will be transmitted to the customer over a communication channel such as, for example, text messaging, email, phone call, paper mail, etc. The customer may be an entity that is expecting to submit payment to the vendor.

A fraudulent party may instead transmit payment instructions to the customer so that the customer believes that he or she is paying the vendor. The payment instructions may include bank account information, routing number, an Automated Clearing House (ACH) number, a Society for Worldwide Interbank Financial Telecommunication (SWIFT) number, a Bank Identification Number (BIN), a vendor's address, or any other information that specifies a manner to receive payment. Upon receiving the payment instructions sent by the fraudulent party, the customer may submit payment according to the payment instructions and pay the fraudulent party instead of the vendor.

As another example, a vendor may intend to sign up a customer for a service to be paid on a recurring basis or to sell the customer a good or service. The vendor may want to ensure that the payment instructions provided by a customer are not a result of fraud. As an example, an online subscription service may request payment information from a customer. The customer may be a fraudulent party that provides payment instructions using a financial account that the customer does not own. For example, a customer may steal credit card information from a victim and supply that credit card information to a vendor as payment instructions.

Embodiments are directed to minimizing the risk of payments made using fraudulent payment instructions. Some embodiments relate to using one or more validation processes to analyze payment information and assess the risk that it relates to a fraudulent payment attempt. Embodiments are directed to a computing system that interfaces with a variety of components to perform independent validation processes and aggregates the results of the validation processes.

General aspects of implementation of the systems and methods of the invention will be described.

Figure 1:
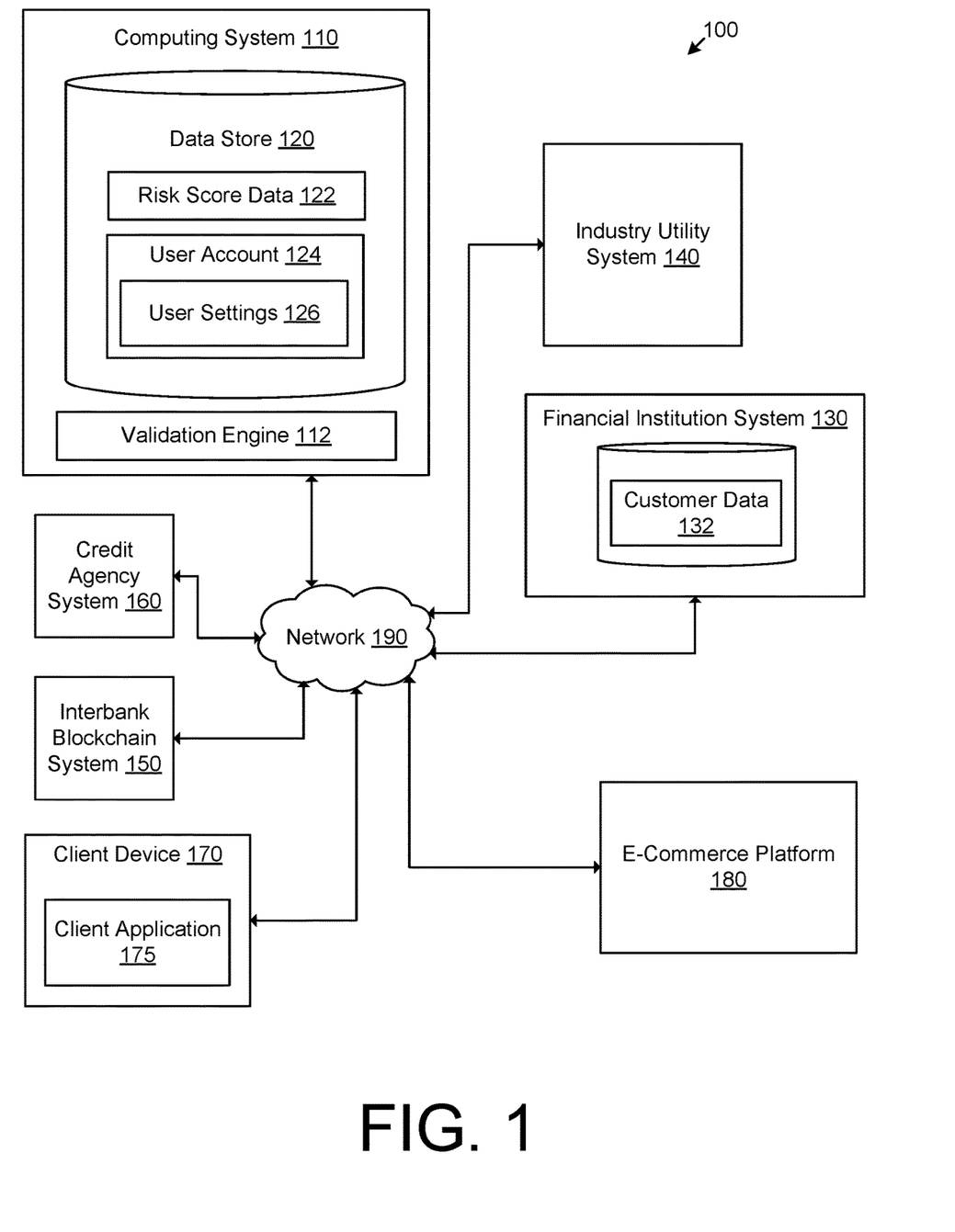
FIG. 1 is a depicts a networked environment according to various embodiments.

FIG. 1 illustrates a networked environment 100 according to various embodiments. The networked environment 100 includes a computing system 110 that may be made up of a combination of hardware and software. The computing system 110 may comprise, for example, a server computer or any other system providing computing capability. Alternatively, the computing system 110 may employ a plurality of computing devices that may be arranged, for example, in one or more server banks or computer banks or other arrangements. Such computing devices may be located in a single installation or they may be distributed among many different geographical locations. For example, the computing system 110 may include a plurality of computing devices that together may comprise a hosted computing resource, a grid computing resource and/or any other distributed computing arrangement. In some cases, the computing system 110 may correspond to an elastic computing resource where the allotted capacity of processing, network, storage, or other computing-related resources may vary over time. The computing system 110 may implement one or more virtual machines that use the resources of the computing system 110. Various software components may be executed on one or more virtual machines.

Various applications and/or other functionality may be executed in the computing system 110 according to various embodiments. For example, the computing system 110 may include a validation engine 112. The validation engine 112 may implement various operations and functionality described herein. The validation engine 112 may receive and process requests to validate payment information. The validation engine 112 may generate a response to the request. The functionality of the validation engine 112 may be accessed through one or more Application Programming Interfaces (APIs). The validation engine 112 may provide a portal that receives requests initiated at remote devices such as, for example a client device. The validation engine 112 is described in greater detail below.

In one embodiment, the validation engine 112 may include one or more computer programs.

The computing system 110 may also include a data store 120. Various data may be stored in the data store 120 or other memory that may be accessible to the computing system 110. The data store 120 may represent one or more data stores 120. The data store 120 may include one or more databases. The data store 120 may be used to store data that is processed or handled by the validation engine 112 or data that may be processed or handled by other applications executing in the computing system 110.

The data store 120 may include risk score data 122, user accounts 124, and potentially other data. The risk score data 122 may comprise risk scores that are calculated by the validation engine 112 as part of the payment information validation operation. The risk score data 122 may include a cumulative risk score that is generated from multiple risk scores. User accounts 124 are maintained for the users of the validation engine 112. A user may be a party that is submitting a request to validate payment information. Such a user may also be referred to as a transaction originator. A user account 124 may contain one or more user settings 126 for how the user wishes to configure the validation assessment. The user settings 126 may comprise default settings that are adjusted in response to user input.

The networked environment 100 may include one or more validation systems such as, for example, a financial institution system 130, an industry utility system 140, an interbank blockchain system, a credit agency system 160, or any other suitable system that contains information about financial transactions or financial accounts. A validation system may be managed by a public entity, governmental body, private party, or any other third party. A validation system may comprise, for example, a server computer or any other system providing computing capability. Alternatively, a validation system may employ a plurality of computing devices that may be arranged, for example, in one or more server banks or computer banks or other arrangements. Such computing devices may be located in a single installation, or they may be distributed among many different geographical locations. For example, the validation system may include a plurality of computing devices that together may comprise a hosted computing resource, a grid computing resource and/or any other distributed computing arrangement. In some cases, the validation system may correspond to an elastic computing resource where the allotted capacity of processing, network, storage, or other computing-related resources may vary over time. The validation system may implement one or more virtual machines that use the resources of the validation system. Various software components may be executed on one or more virtual machines.

A validation system may include a database, a memory, or storage for storing information about customers, vendors, or other entities. The information may contain the names of individuals and their contact information (e.g., phone number, email address, mailing address, etc.). The validation engine 112 may communicate with each validation system using, for example, APIs, function calls, request-response protocols, or other communication protocols.

The financial institution system 130 is an example of a validation system. The financial institution system 130 may include one or more servers and one or more data stores of a financial institution such as, for example, a bank. The financial institution system 130 may store customer data 132 such as, for example, bank account numbers, bank account customer names, bank account customer contact information, transaction history of various customers, information pertaining to financial instruments (e.g., credit card numbers, debit card numbers, etc.), or other data pertaining to the customers of a bank or financial account. In some embodiments, access to the financial institution system 130 is restricted and highly confidential. The validation engine 112 may be developed by the financial institution that controls or otherwise owns the financial institution system 130 so as to provide a validation service by the financial institution.

The industry utility system 140 is another example of a validation system. Some examples of industry utility system 140 include Confirmation of Payee (CoP), SurePay, and other computing environments that provide services such as name verification, user authentication, and validation. Industry utility systems 140 may provide open banking connectivity to allow the validation engine 112 to submit queries and receive responses.

The interbank blockchain system 150 is another example of a validation system. The interbank blockchain system 150 may include blockchain-based authentication system that is decentralized among a plurality of participants such as, for example, various financial institutions. The Interbank Information Network (IIN)® by J.P. Morgan Chase is an example of an interbank blockchain system 150.

A credit agency system 160 is another example of a validation system. By way of example, Experian, Transunion, and Equifax, may each include computing environments that serve as credit agency systems 160. A credit agency system 160 may also be a system that aggregates data originating from Experian, Transunion, and/or Equifax.

The networked environment 100 may further include one or more client devices 170. A client device 170 may be, for example, a cell phone, laptop, personal computer, mobile device, or any other computing device used by a user. The client device 170 may be connected to or otherwise include a scanner, camera, or other sensor to capture a picture. The client device 170 may execute a client application 175. A client application 175 may be a web browser or dedicated mobile application. The client application 175 may render a user interface to access a portal provided by the validation engine 112.

The networked environment 100 may further include an e-commerce platform 180. The e-commerce platform may be implemented as one or more webservers that enable users to view online products or services, access product information or service information, submit requests, and purchase products or services for sale. The e-commerce platform 180 may comprise a portal to provide access to customers who desire to purchase goods and services by the e-commerce platform. The e-commerce platform may provide services on a recurring basis such as, for example, a product delivery service, a media streaming service, or any other recurring service.

Components of the networked environment may be connected to a network 190, such as the Internet, intranets, extranets, wide area networks (WANs), local area networks (LANs), wired networks, wireless networks, or other suitable networks, etc., or any combination of two or more such networks. In this respect, the network 190 may provide a communication in a client-server system to allow client devices to communicate with a computing system 110 and to allow a computing system 110 to interface with other systems such as, for example, various validation systems. The network 190 also provides access to an e-commerce platform 180 by a client device 170 and the computing system 110.

Next is description of examples of operations that may take place in the networked environment 100 according to embodiments. A financial transaction may involve a transaction originator providing payment information to a transaction counterparty. It should be noted that the transaction originator may also receive payment information from the transaction counterparty. The payment information may include information such as a bank account information, financial instrument information, payee information, and/or payor information. Additional information, less information, and/or different information may be included as is necessary and/or desired. At least a portion of the payment information may be used to initiate a payment. Prior to initiating the payment, a request to validate the payment information may be sent to the validation engine 112 to assess whether there is a risk of fraud associated with the payment information.

In embodiments, an Application Programming Interface (API) may be used to allow a user to submit a validation request to validate payment information. A computing system 110 may receive the request and determines whether the payment information provided in the request is valid. The validation engine 112 may calculate one or more risk scores by communicating with various validation systems, and generating risk score data 122. A response to the validation request may be generated based on the risk score data 122 and may be transmitted to the entity that submitted the request. The response may indicate a likelihood or risk level that the payment information is a result of fraud.

In some embodiments, a website portal may be generated and provided by the validation engine 112 to allow a user to submit a validation request to validate payment information using a client device 170.

In some embodiments, a bulk request to validate payment information may be submitted to the validation engine 112. The bulk request may include a file of multiple instances of payment information corresponding to different financial transactions. In this respect, the bulk request may include a file comprising payment information that was received from a plurality of customers. The validation engine 112 may determine whether the payment information provided in the request is valid for each payment information instance. A response may be generated and transmitted to the user. The response may include a file that indicates a likelihood or risk level that each payment information instance is a result of fraud.

In some embodiments, a request to validate payment information may be automatically generated and submitted in response to receiving payment information from a customer. For example, if a user registers for a paid online service or purposes a good or service from an e-commerce platform 180, the e-commerce platform 180 may solicit the user's customer for payment information such as, for example, prompting the customer to provide credit card information, debit card information, e-check information, bank account information, etc. The e-commerce platform 180 may automatically generate a request to validate payment upon receiving the payment information from the customer.

Alternatively, the user may register for such a service, and may receive payment information (e.g., where to send a payment) for a merchant or vender or other counterparty, and the e-commerce platform 180 may automatically generate a request to validate payment upon receiving the payment information from the counterparty.

To validate payment information, the validation engine 112 may query a plurality of validation systems in parallel or in sequence. Each validation system may operate independently from other validations systems. The validation engine 112 may submit a query to one or more validation systems using at least a portion of the payment information in order to receive query responses pertaining to one or more of the parties referenced in the payment information. The validation systems may return a query response comprising a binary response (e.g., match/no match, yes/no, etc.), a non-binary response (e.g., yes/no/maybe, some of the information it has in its systems, etc.), combinations thereof, etc. The validation engine 112 may perform one or more matching algorithms to generate a risk score based on the query responses for a particular validation system. The risk scores may be stored as risk score data 122. In some embodiments, multiple risks scores may be aggregated to generate a cumulative risk score. The cumulative risk score may be provided to the requesting entity as a response.

In this respect, each of the validation systems may perform a separate validation process based on the information that the validation system may have access to that may yield a respective result indicating the likelihood that the payment information is a result of fraud. The computing system 110 may aggregate the results received from each validation process to generate a cumulative score.

One example of a validation process may be performed by the financial institution system 130. A financial institution may store customer data 132 such as user account information, bank account information, transaction data, or other data for various customers of the financial institution. The validation engine 112 may cross-reference the customer data 132 with the payment information to verify whether the payment information is a result of fraud.

To illustrate, a customer may sign up for an online service with an e-commerce platform 180 using a client device 170 and may provide information such as a customer name, email address, phone number, credit-card information, etc. The e-commerce platform 180 may submit a request to validate the payment information to the validation engine 112. The payment information may include at least some of the information provided by the customer to register with the e-commerce platform 180 such as, for example, the customer name, email address, phone number, credit-card information. The computing system may cross reference this payment information with the customer data 132 to generate a risk score using the financial institution system 130.

Other examples include obtaining information from an industry utility system 140, interbank blockchain system 150, or credit agency system 160, and cross referencing that information with at least a portion of the payment information of a validation request to generate a risk score.

Figure 2:
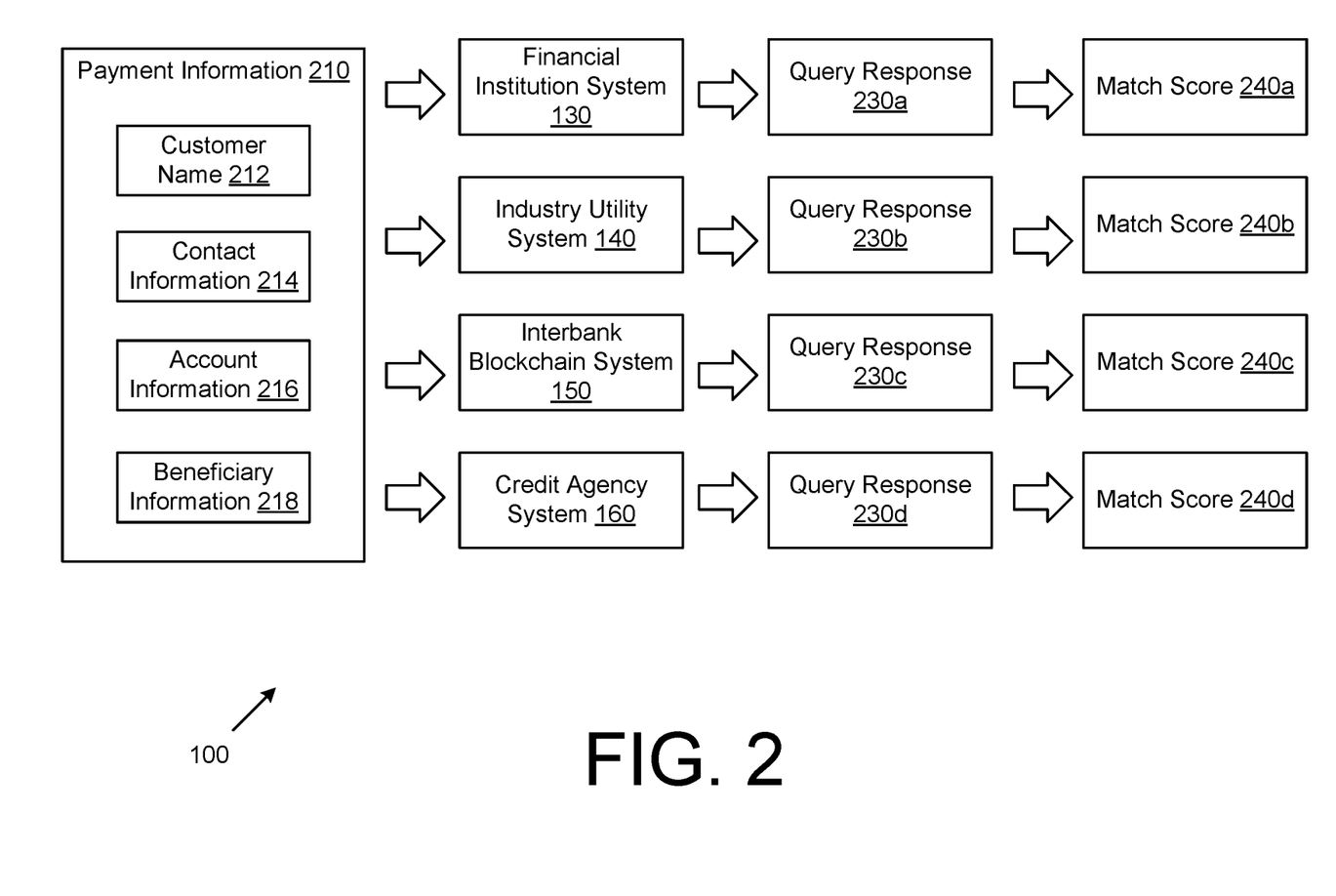
FIG. 2 depicts a method for processing a validation request and generating a response in a networked environment according to various embodiments.

FIG. 2 illustrates the processing of a validation request and the generation of a response in a networked environment according to various embodiments. FIG. 2 illustrates payment information 210 that may be received as part of a financial transaction. Before initiating the financial transaction, a validation request to validate the payment information 210 may be submitted to a validation engine 112 to determine the risk that the payment information 210 is a product of fraud.

The payment information may include a customer name 212, contact information 214, account information 216, beneficiary information 218, or other information relating to initiating a financial transaction. The customer name 212 may comprise a first name, middle name, last name, prefix, suffix, or any other identifier for a customer who wishes to submit a payment. Contact information 214 may include an email address, phone number, mailing address, or other information used to identify, locate, or authenticate a customer. Account information 216 may include a bank account number, a credit card number, a debit card number, a gift card number, or any other information that may be used to identify a payment source. Beneficiary information 218 may include information associated with a payee, such as vendor or merchant, including, for example a vendor identification, a vendor name, or vendor contact information. Beneficiary information 218 may also include information to identify a payment destination of the vendor such as, for example, a bank account number.

The payment information 210 may be included in a request to validate. The validation engine 112 may individually query each of a plurality of validation system such as, for example, a financial institution system 130, an industry utility system 140, an interbank blockchain system 150, and a credit agency system 160 using at least some of the payment information 210. The query may include, for example, a function call, a request, or any other suitable communication used to query each validation system.

Each validation system (e.g., financial institution system 130, industry utility system 140, Interbank Blockchain system 150, credit agency system 160, etc.) may generate a corresponding query response 230*a-d*. In one embodiment, each query response 230*a-d* may include, for example, a customer name, customer contact information, account information, or beneficiary information. Instead, or in addition, the query responses 230*a-d* may also include binary responses, such as yes/no, match/no match, etc.

The validation engine 112 may be configured to compare the payment information 210 to each of the query responses 230*a-d* to determine a degree of data match. The comparison may include fuzzy matching logic to account for issues with misspelling or minor name variations.

The validation engine 112 may use artificial intelligence or machine learning to perform or assist in the comparison. In some embodiments, the validation engine 112 may include an additive model, linear model, a neural network, a support vector machine, a decision tree, or any other machine learning model or artificial intelligence model. In some embodiments, the validation engine 112 may be trained according to training data comprising datasets. In some embodiments, the artificial intelligence-based system uses unsupervised learning to perform the comparison. For example, the validation engine 112 may perform clustering, anomaly detection, or implement a neural network.

After the validation engine 112 compares each of the query responses 230a-d to the payment information, the validation engine 112 generates corresponding match scores 240a-d for each payment validation system. A match score may reflect a degree that the payment information 210 matches a corresponding query response 230a-d.

Note that although four match scores 240a-d are illustrated in FIG. 2, it should be recognized that additional or fewer match scores may be generated, as this depends on the number of validation systems that may be available to query, the number of validation systems that responded, etc.

The match scores 240a-d may be weighted according to user settings 126. For example, if a user believes that query responses provided by the financial institution system 130 is the most trustworthy, then the match score 240a corresponding to the financial institution system 130 may be given a greater weight compared to the other match scores 240b-d. After weighting each match score 240a-d, the weighted match scores may be aggregated into a cumulative match score.

The cumulative match score may be included in a response to the request to validate the payment information 210. In some embodiments, a threshold may be applied to the cumulative match score to convert it to a binary result. The binary result may indicate whether the payment information is a product of fraud or not. The threshold may be specified in the user settings 126.

Figure 3:
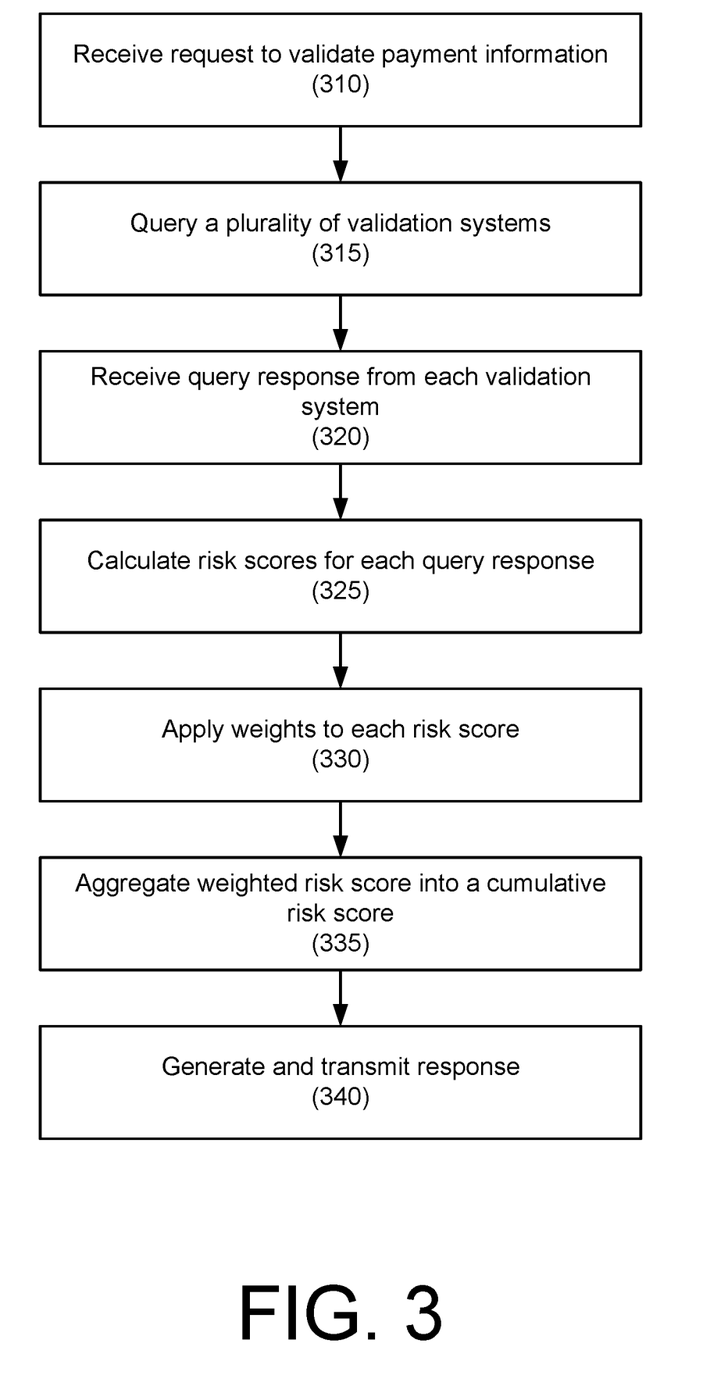
FIG. 3 depicts an exemplary method of operations performed by a validation engine in a networked environment according to various embodiments.

FIG. 3 is a flowchart illustrating an example of operations performed by a validation engine in a networked environment according to various embodiments. At least some portions of the method may be performed by a computing system or a validation engine executed by a computing system.

In step 310, a validation engine may receive a request to validate payment information. The request may be received from a client device using a portal, and the payment information may include, for example, a bank account information, financial instrument information, payee information, and/or payor information.

The request may be generated and transmitted automatically in response to a client purchasing a good or service from an e-commerce platform. The request may be part of an API call initiated by a program executing remotely from a computing system that executes the validation engine.

In embodiments, the request may be a bulk request comprising a file. The file may include a plurality of payment information instances corresponding to separate financial transactions.

The request may originate with either party to the transaction.

In step 315, the validation engine may query a plurality of validation systems with at least some of the payment information. In this respect, the validation engine may obtain information from a plurality of validation systems to assess the likelihood that the payment information is a product of fraud.

In one embodiment, the validation engine may query validation systems in accordance with a client's configuration. For example, a client may only wish to query certain validation systems, and not others.

In another embodiment, the validation engine may select the validation systems to query based on their likelihood to return meaningful query responses. In one embodiment, machine learning may be used to train the validation engine on which validation systems to query so that the validation engine queries validation systems that are likely to return meaningful query responses.

In another embodiment, the validation engine may select the validation systems to query based on the value of the transaction, the type of transaction, etc.

In another embodiment, the validation engine may query the validation system that is most likely to produce meaningful query responses. For example, if the payment information identifies a financial account, the validation engine may query the financial institution that holds that account because the query response may be dispositive, and not additional querying may be needed.

In step 320, the validation engine may a receive corresponding query response from each queried validation system. The query response may include a binary response, a non-binary response, combinations thereof, etc.

In step 325, the validation engine may calculate risk scores for each query response. For example, the validation engine may compare the payment information to data contained in each query response to determine a degree of match. The degree of match may be quantified as a risk score.

In one embodiment, individual components of the query response may be separately weighted as is necessary and/or desired, and then the aggregated weighted components may be weighted as the query response.

In step 330, the validation engine may apply weights to each risk score for each validation system. The weights may be default weights. The weights may be weights specified by a user via a client device. The validation engine may provide a user interface (e.g., a dashboard), to allow the user to prioritize or otherwise weight each validation system. The weights may be stored as user settings.

In one embodiment, the weights may be assigned based on machine learning. For example, if one validation system has been wrong in the past, that validation system may receive a lower weighting than a validation system that has been correct in the past.

In step 335, the validation engine may aggregate the weighted risk scores to generate a cumulative risk score. In some embodiments, the cumulative risk score may be converted into a binary result by applying a threshold. The threshold may be user specified and stored as user settings.

In step 340, the validation engine generates and transmits a response to the validation request to the client device. The response may include the risk scores, the weighted risk scores, the cumulative risk score, and/or a binary result based on applying a threshold to the cumulative risk score. The response may comprise a batch response to a batch request. The batch response may comprise a file indicating risk score data for each payment information instance.

In some embodiments, the request to validate payment information may be initiated upon the scanning of an optical identifier such as, for example, a QR code, bar code, or other optical identifier. The optical identifier may be included in a message or other communication to a party interested in verifying bank account information of a user.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor. As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processors and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communication technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Java, Python, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-based method for processing a validation request, comprising:
   receiving, at a validation computer program executed by a server comprising at least one computer processor and from a client device, a request to validate payment information;
   querying, by the validation computer program, a plurality of validation systems with at least some of the payment information;
   receiving, at the validation computer program, a query response from each validation system;
   calculating, by the validation computer program, a risk score for each validation system based on a comparison between the payment information and the query response;
   weighting, by a machine learning model of the validation computer program, the risk score for each validation system, wherein the machine learning model is trained to determine weighting based on a past accuracy of each validation system by:
      receiving, from the plurality of validation systems, respective risk scores for each validation system corresponding to at least one past request,
      retrieving, from the validation computer program, at least one risk determination corresponding to the at least one past request,
      comparing the received risk scores to the risk determinations, and
      determining the accuracy of each validation system based on the comparison;
   aggregating, by the validation computer program, the weighted risk scores into a cumulative risk score;
   converting the cumulative risk score into a binary result by applying a threshold, wherein the threshold is user-specified and stored as user settings; and
   outputting the cumulative risk score to the client device; wherein the client device takes an action in response to the cumulative risk score.

2. The method of claim 1, wherein the request is received at a portal.

3. The method of claim 1, wherein the request is automatically generated by the client device in response to the client device scanning a machine-readable code.

4. The method of claim 1, wherein the payment information comprises bank account information, financial instrument information, payee information, and/or payor information.

5. The method of claim 1, wherein the request is received in a batch comprising a plurality of requests.

6. The method of claim 1, wherein the validation systems comprise a financial institution system, an industry utility system, an interbank blockchain system, and/or a credit agency system.

7. The method of claim 1, wherein the plurality of validation systems is selected from a second plurality of validation systems, wherein the plurality of validation systems is a subset of the second plurality of validation systems.

8. The method of claim 1, wherein each risk score is based on a degree of match between the payment information and the query responses.

9. The method of claim 1, wherein the validation computer program calculates the risk score for each response using an additive model, a linear model, a neural network, a support vector machine, and/or a decision tree.

10. A computer-based system for processing a validation request, comprising:
a client device;
a server comprising at least one computer processor and executing a validation computer program; and
a plurality of validation systems;
wherein:
the validation computer program receives a request to validate payment information from the client device;
the validation computer program queries the plurality of validation systems with at least some of the payment information;
each of the plurality of validation systems returns a query response to the validation computer program;
the validation computer program calculates a risk score for each validation system based on a comparison between the payment information and the query response;
the validation computer program weighing, via a machine learning model, the risk score for each validation system, wherein the machine learning model is trained to determine weighting based on a past accuracy of each validation system by:
receiving, from the plurality of validation systems, respective risk scores for each validation system corresponding to at least one past request,
retrieving at least one risk determination corresponding to the at least one past request,
comparing the received risk scores to the risk determinations, and
determining the accuracy of each validation system based on the comparison;
the validation computer program aggregates the weighted risk scores into a cumulative risk score and converts the cumulative risk score into a binary result by applying a threshold, wherein the threshold is user-specified and stored as user settings;
the validation computer program outputs the cumulative risk score to the client device; and
the client device takes an action in response to the cumulative risk score.

11. The system of claim 10, wherein the request is received at a portal.

12. The system of claim 10, wherein the request is automatically generated by the client device in response to the client device scanning a machine-readable code.

13. The system of claim 10, wherein the payment information comprises bank account information, financial instrument information, payee information, and/or payor information.

14. The system of claim 10, wherein the request is received in a batch comprising a plurality of requests.

15. The system of claim 10, wherein the validation systems comprise a financial institution system, an industry utility system, an interbank blockchain system, and/or a credit agency system.

16. The system of claim 10, wherein the plurality of validation systems is selected from a second plurality of validation systems, wherein the plurality of validation systems is a subset of the second plurality of validation systems.

17. The system of claim 10, wherein each risk score is based on a degree of match between the payment information and the query responses.

18. The system of claim 10, wherein the validation computer program calculates the risk score for each response using an additive model, a linear model, a neural network, a support vector.

* * * * *